United States Patent
Thomas et al.

(10) Patent No.: US 10,908,969 B2
(45) Date of Patent: Feb. 2, 2021

(54) MODEL DRIVEN DYNAMIC MANAGEMENT OF ENTERPRISE WORKLOADS THROUGH ADAPTIVE TIERING

(71) Applicant: International Business Machines Corporation, Armonk, NY (US)

(72) Inventors: Santosh Thomas, Chennai (IN); Manish Gupta, New Delhi (IN); Sreekrishnan Venkateswaran, Bangalore (IN); Piotr Uzar, Wroclaw (PL)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 16/122,435

(22) Filed: Sep. 5, 2018

(65) Prior Publication Data
US 2020/0073723 A1    Mar. 5, 2020

(51) Int. Cl.
*G06F 9/50* (2006.01)
*H04L 12/24* (2006.01)
*G06N 7/00* (2006.01)
*H04L 29/08* (2006.01)

(52) U.S. Cl.
CPC .......... *G06F 9/5077* (2013.01); *G06F 9/5083* (2013.01); *G06N 7/00* (2013.01); *H04L 41/0893* (2013.01); *H04L 41/5012* (2013.01); *H04L 41/5022* (2013.01); *H04L 41/5029* (2013.01); *H04L 67/10* (2013.01)

(58) Field of Classification Search
CPC .. G06F 9/50–9/5088; G06N 7/00–7/08; H04L 41/00–41/5096; H04L 67/10
See application file for complete search history.

(56) References Cited

U.S. PATENT DOCUMENTS

| | | | |
|---|---|---|---|
| 6,871,233 B1 | 3/2005 | Bearden et al. | |
| 7,774,458 B2 | 8/2010 | Trinon et al. | |
| 7,848,988 B2 | 12/2010 | Hellerstein et al. | |
| 7,930,396 B2 | 4/2011 | Trinon et al. | |
| 8,127,336 B2 | 2/2012 | Bienek et al. | |
| 8,312,419 B2 | 11/2012 | Wilcock et al. | |
| 8,631,105 B2 | 1/2014 | Aschoff et al. | |
| 8,682,955 B1 | 3/2014 | Monden et al. | |
| 8,868,749 B2 | 10/2014 | Bartfai-Walcott et al. | |
| 9,229,777 B2 | 1/2016 | Boss et al. | |
| 9,413,619 B2 | 8/2016 | Akolkar et al. | |
| 2003/0187970 A1 | 10/2003 | Chase et al. | |
| 2005/0038833 A1 | 2/2005 | Colrain et al. | |
| 2007/0294420 A1 | 12/2007 | Mohindra et al. | |
| 2008/0005317 A1 | 1/2008 | Diao et al. | |
| 2008/0126163 A1 | 5/2008 | Hogan et al. | |
| 2009/0320039 A1* | 12/2009 | Garbow | G06F 9/4881 718/105 |

(Continued)

FOREIGN PATENT DOCUMENTS

EP    1955151 A1    8/2008

*Primary Examiner* — Clayton R Williams
(74) *Attorney, Agent, or Firm* — Brown & Michaels, PC; Christopher Pignato

(57) ABSTRACT

A model drive system models tier changes within enterprise workloads by analyzing past data to automatically generate the capability to detect factors or situations which demand a change of service tier in a preferably hybrid cloud context with potentially multiple providers.

20 Claims, 9 Drawing Sheets

(56) References Cited

U.S. PATENT DOCUMENTS

| | | | |
|---|---|---|---|
| 2011/0061051 A1* | 3/2011 | Haber | G06F 9/5027 |
| | | | 718/100 |
| 2011/0270968 A1 | 11/2011 | Salsburg et al. | |
| 2012/0089726 A1 | 4/2012 | Doddavula | |
| 2014/0324647 A1 | 10/2014 | Iyoob et al. | |
| 2015/0222723 A1 | 8/2015 | Adapalli et al. | |
| 2016/0132804 A1* | 5/2016 | Croft | G06Q 10/06313 |
| | | | 705/7.23 |
| 2016/0140474 A1* | 5/2016 | Vekker | G06Q 10/06393 |
| | | | 705/7.39 |
| 2016/0321115 A1* | 11/2016 | Thorpe | G06F 11/3409 |
| 2017/0017903 A1* | 1/2017 | Gray | G06F 16/26 |
| 2017/0193349 A1* | 7/2017 | Jothilingam | G06N 3/006 |

* cited by examiner

Availability A := $(c_1a_1+c_2a_2+...c_na_n)/(c_1+c_2+...+c_n)$

MODEL DRIVEN DYNAMIC MANAGEMENT OF ENTERPRISE WORKLOADS THROUGH ADAPTIVE TIERING

BACKGROUND

The present invention relates to enterprise workloads, and more specifically to model driven dynamic management of enterprise workloads through adaptive tiering.

Through the lifecycle of a workload, the assignment of a single management tier may not be optimal. Currently, the tier assignment of the workloads is static and change of a tier (e.g. tools, people, processes, service level agreements (SLAs)) is manually driven, infested with disruption, delays, and human error. For example, if usage of a workload dropped from 100,000 users to 100 users, it may not be as critical to the business and resources are wasted and costs are increased. When enterprises are looking to minimize costs associated with management of workloads and increase the rate of return on investment (ROI), a stringent and static assignment of a management tier to a workload is disadvantageous.

Presently, systems and mechanisms for detecting a need to alter a tier assignment and performing a tier change do not exist. Furthermore, the change of tier necessary is not predictable.

SUMMARY

According to one embodiment of the present invention, a method of dynamically managing enterprise workloads between a plurality of management service tiers is disclosed. The method comprising the steps of: receiving a user defined workload model comprising: at least a partition of time into blocks of variable sizes across a workload topology and assignment of expected values for each time block for workload parameters of software stack; analyzing past data of the workload topology to suggest potential service level agreements through learning models that map workload parameters to the service level agreements; determining potential management service tiers to achieve service level agreements with associated costs for duration and switching of the workload; sending the potential management service tiers to the user for approval; as a result of receiving approval, generating a tier change rule policy for changing workloads between the management service tiers to achieve service level agreements with associated costs for duration of the time into blocks; and executing a change of the workload between management service tiers according to the tier change rule policy.

According to another embodiment of the present invention, a computer program product for dynamically managing enterprise workloads between a plurality of management service tiers through a computer is disclosed. The computer comprising at least one processor, one or more memories, one or more computer readable storage media, the computer program product comprising a computer readable storage medium having program instructions embodied therewith. The program instructions executable by the computer to perform a method comprising: receiving, by the computer, a user defined workload model comprising: at least a partition of time into blocks of variable sizes across a workload topology and assignment of expected values for each time block for workload parameters of software stack; analyzing, by the computer, past data of the workload topology to suggest potential service level agreements through learning models that map workload parameters to the service level agreements; determining, by the computer, potential management service tiers to achieve service level agreements with associated costs for duration and switching of the workload; sending, by the computer, the potential management service tiers to the user for approval; as a result of receiving approval, generating, by the computer, a tier change rule policy for changing workloads between the management service tiers to achieve service level agreements with associated costs for duration of the time into blocks; and executing, by the computer, a change of the workload between management service tiers according to the tier change rule policy.

According to another embodiment of the present invention, a computer system for dynamically managing enterprise workloads between a plurality of management service tiers. The computer system comprising a computer comprising at least one processor, one or more memories, one or more computer readable storage media having program instructions executable by the computer to perform the program instructions comprising: receiving, by the computer, a user defined workload model comprising: at least a partition of time into blocks of variable sizes across a workload topology and assignment of expected values for each time block for workload parameters of software stack; analyzing, by the computer, past data of the workload topology to suggest potential service level agreements through learning models that map workload parameters to the service level agreements; determining, by the computer, potential management service tiers to achieve service level agreements with associated costs for duration and switching of the workload; sending, by the computer, the potential management service tiers to the user for approval; as a result of receiving approval, generating, by the computer, a tier change rule policy for changing workloads between the management service tiers to achieve service level agreements with associated costs for duration of the time into blocks; and executing, by the computer, a change of the workload between management service tiers according to the tier change rule policy.

DETAILED DESCRIPTION

Figure 1:
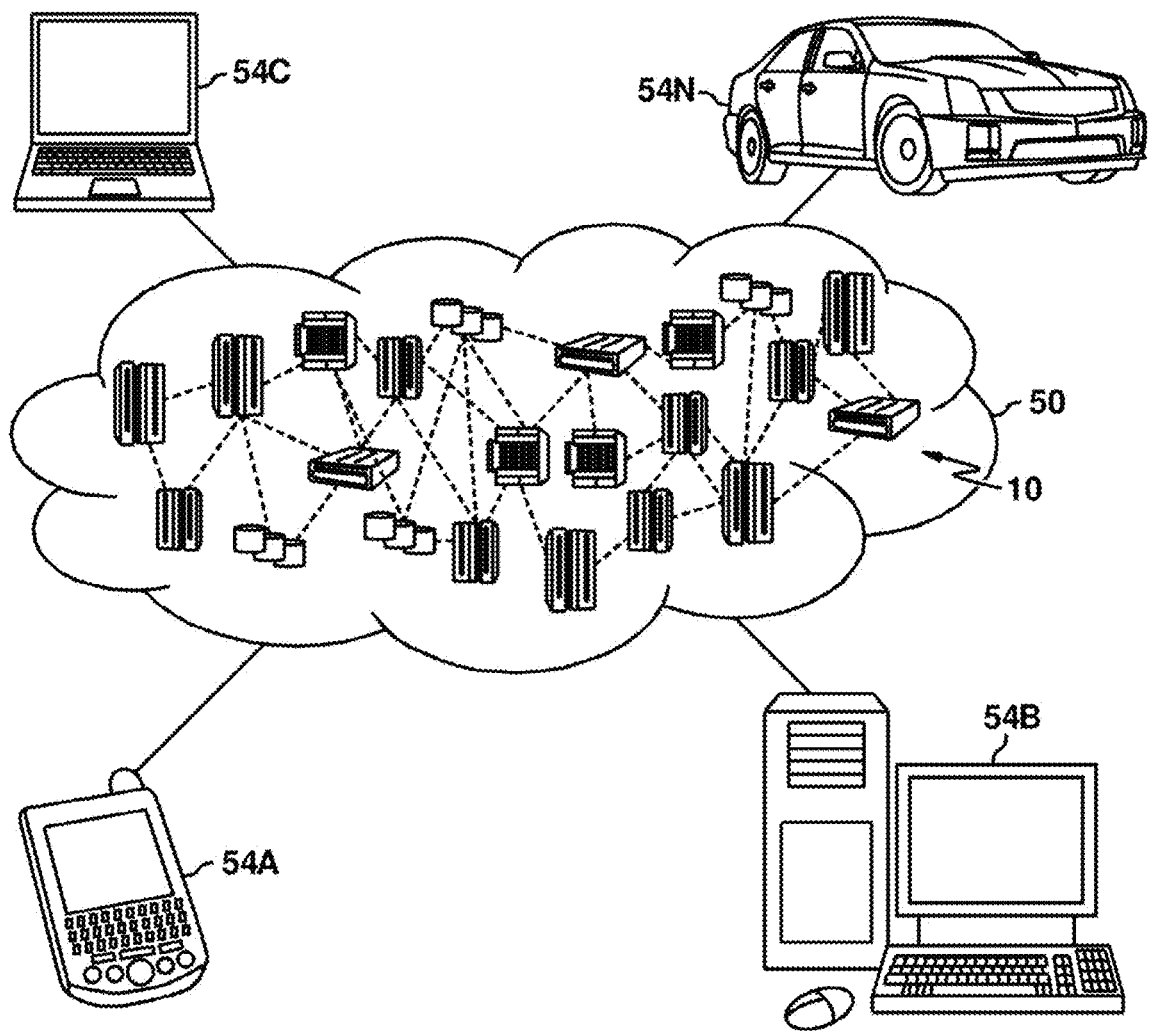
FIG. 1 depicts a cloud computing node according to an embodiment of the present invention.

In an embodiment of the present invention, it will be recognized that a model drive system models tier changes within enterprise workloads by analyzing past data to automatically generate the capability to detect factors or situations which demand a change of service tier in a preferably hybrid cloud context with potentially multiple providers. For example, the factors can include a low (or a high) business demand, or change in the volume of the tickets or type of tickets, etc.

In an embodiment of the present invention, rule tuples (condition→action) are defined, where Boolean conditions represent what to detect, as well as computing when a need for a change of tier is true. The condition in a rule tuple is specified in terms of metrics & arithmetic/logical operators, where the metrics could be monitored (or accessed from a datastore) or even manually provided. Once a condition is fulfilled, the action portion of the rule is executed. The action portion preferably notifies users about the initiation of the change for tier. An optional approval process may be included for implementation of the tier change. The action portion of the rule is responsible for the change of a tier that includes, as per the requirements of the tier reconfiguration of the workload/management tools (e.g. uninstalling/installing agent software), reconfiguration of monitoring/discovery systems, reassignment of duties of people involved in management of the workload, change of processes used to manage the workload according to the tier.

In another embodiment of the present invention, a modeler is present that enables the ability to model tier changes for the future. This modeler reduces uncertainty and thus tier changes are well-understood without losing dynamics associated with tier changes.

It is to be understood that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer MB, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
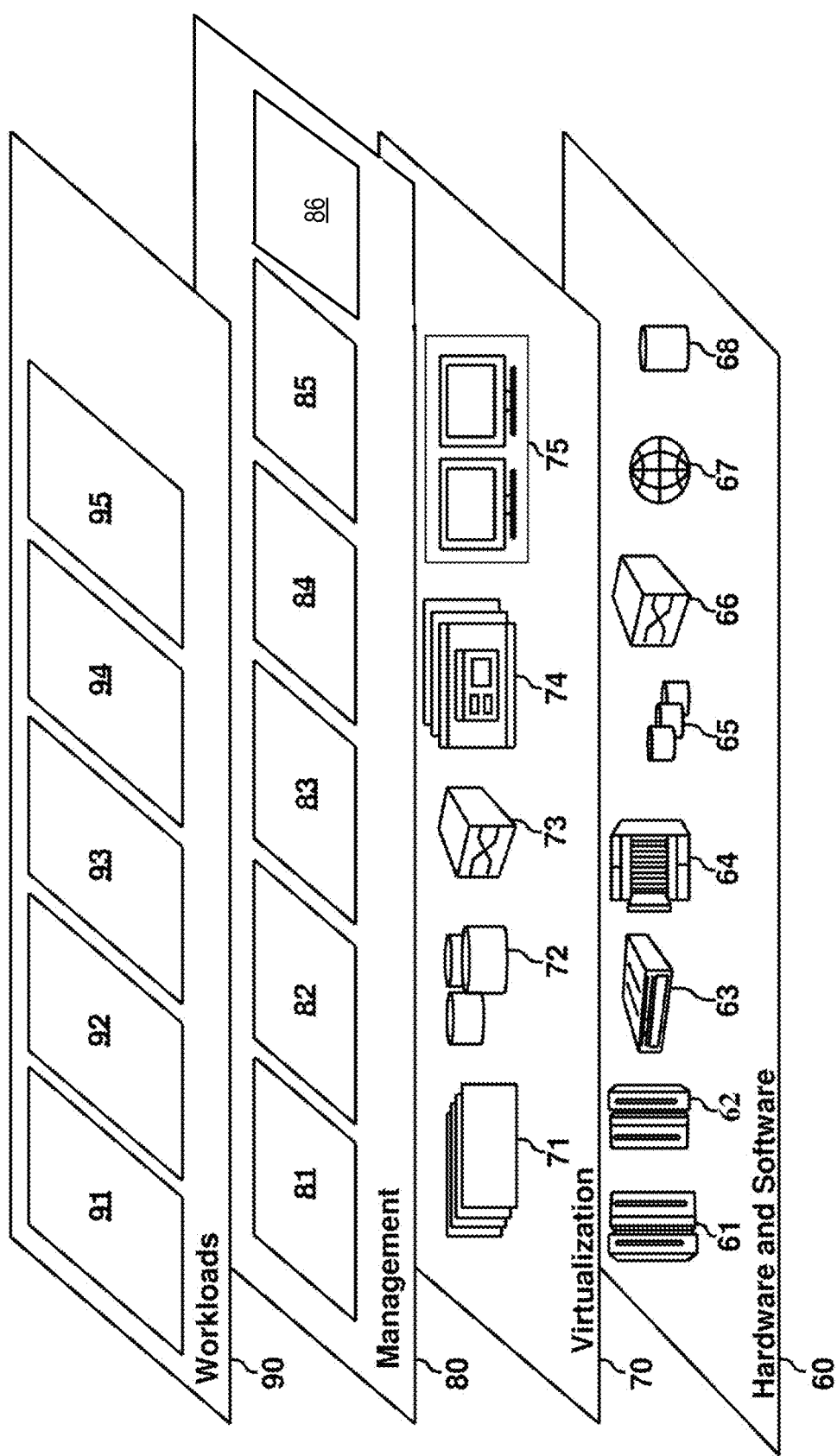
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

Figure 7:
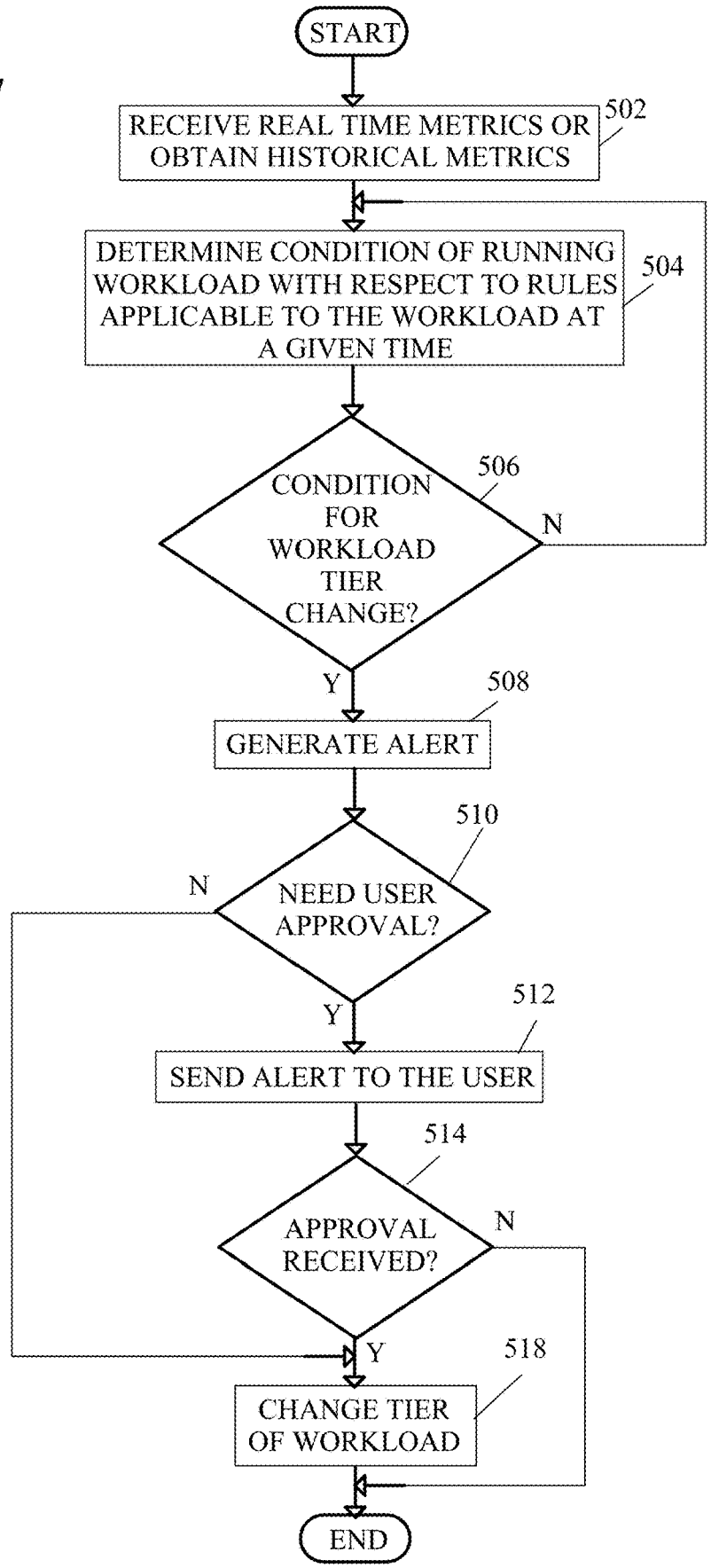
FIG. 7 shows a dynamic process of tier change with condition detector and service tier switcher.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workload management 86 provides dynamic management of enterprise workloads. The management of the workload takes place over multiple tiers, for example a low touch tier, a medium touch tier and a high touch tier. An example of the lifecycle of a workload managed over three tiers is shown in FIG. 7 and discussed in further detail below. The workload management preferably takes place through a service management tier which consists of tools, processes, people, SLA, providers, and business support system attributes. The workload could be a server, a virtual machine (VM) or what programs run on the server of the VM. A workload can contain at least one VM or container or server. Workload management within the tiers determines the costs associated with maintaining the workload for the customer or company. The workload management can be managed by a management service provider which in one embodiment is different than the hosting provider, such that mutually exclusive subsets of an overall workload for a customer can be managed by different management service providers. In this example, one of the management service providers acts as the end-to-end service management provider.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

Figure 3:
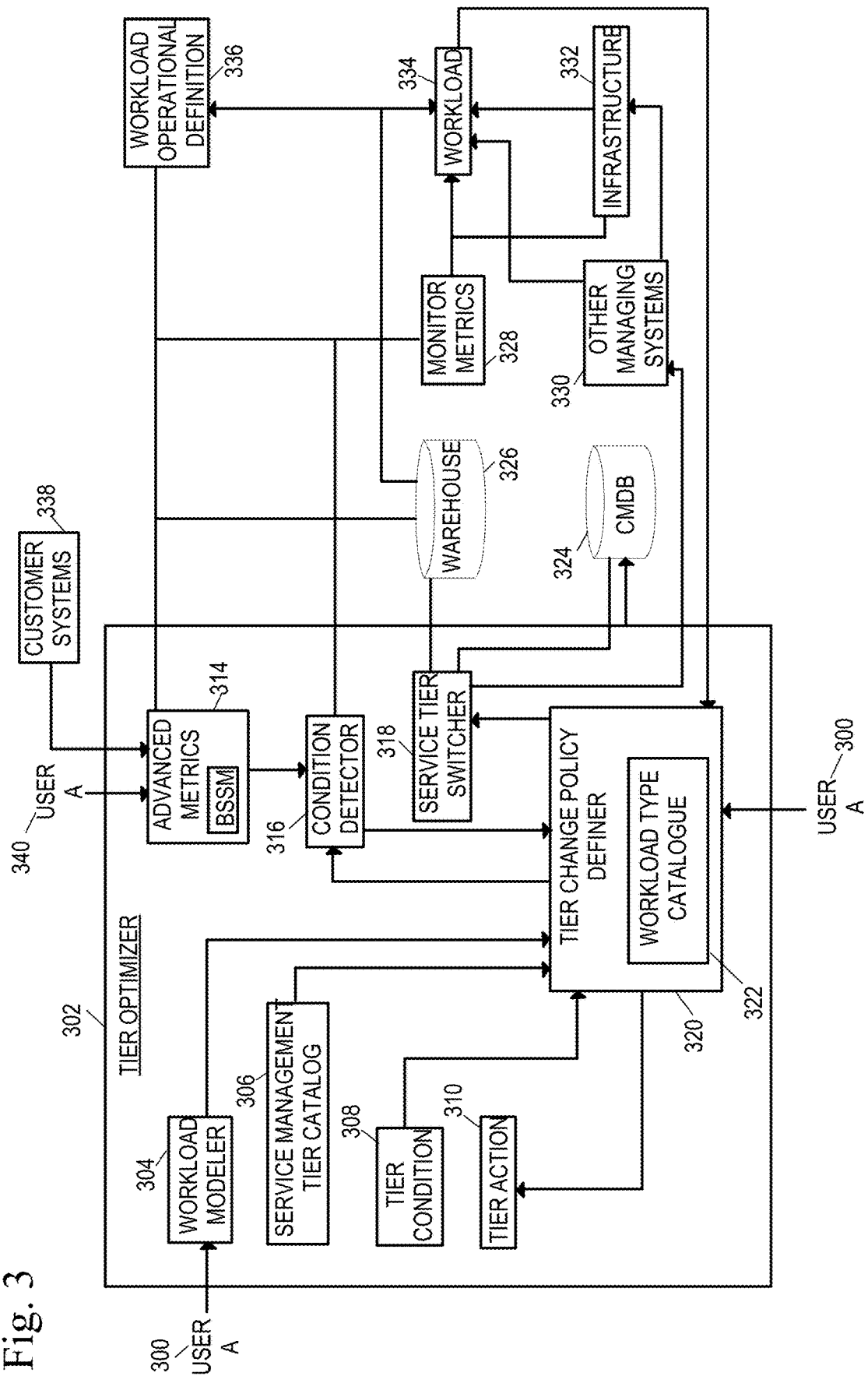
FIG. 3 shows an example of a dynamic tiering system of an embodiment of the present invention.

FIG. 3 shows a schematic of a dynamic tiering system.

The tier optimizer 302 is part of the workload management 86 of the workload layer 80. The tier optimizer 302 includes a workload modeler 304, service management tier catalog 306, a tier condition 308, a tier action 310, advanced metrics 314, condition detector 316, service tier switcher 318 and a tier change policy definer 320.

The workload modeler 304 systematically creates a model based on input from a user 300 with design rules for tier switching. The workload modeler defines expected values and parameters that define functional and non-functional aspects of workloads, workload topology, classification of similar workloads based on a certain type of business or technical function linked to a tier/provider for a particular period of time, generates rules for tier change for each time block and estimates availability and tier for each time block using past data. The workload modeler 304 additionally includes business-level parameters such as revenue or IT-level parameters, including a number of problem tickets generated for a given time period. The workload modeler 304 is sent to the tier change policy definer 320. The non-functional requirements of the workload are defined in terms of availability in regards to SLAs, scalability in regards to elasticity of workload, security in regards to standards to be followed, performance in regards to cloud infrastructure provider supported ranges, interoperability in regards to moving between cloud providers, manageability in regards to parameters to be monitored or managed, and adaptability in regards to how the change workload types. All of the above variables can be defined in terms of the tier type and provider based on the non-functional requirements (NFRs). The workload modeler 304 allows a user to quickly create rules with conditions to switch the tier and action available such as choice of conditions, tiers and business attributes.

The service management tier catalog 306 includes tiers with associated predefined tools, people, processes and SLA. The service management tier catalog 306 provides data to the tier change policy definer 320. A service management tier is a pre-determined set of computer-implemented management service(s) that a customer can purchase as a bundle; the bundles (respectively corresponding to the tiers) may be selected in their content so that there is a series of more inclusive and/or more expensive bundles/tiers, but this is not necessarily required.

A tier condition 308 is the state of the running workload with respect to the rules applicable to the workload at a given time and generates an alert if the condition is true. The condition is a Boolean condition relating at least one metric. The tier condition 308 receives and sends data to the tier change policy definer 320. The condition in a rule tuple is specified in terms of metrics & arithmetic/logical operators, where the metrics could be monitored (or accessed from a datastore) or even manually provided.

A tier action 310 is a specification of a process to be executed to implement the associated workload tier. The tier action 310 receives and sends data to the tier change policy definer 320.

Advanced metrics 314 includes metrics, such as business support systems metrics (BSSM), which are metrics related to business support systems such as cost, budget, variance, cost vs budget ratios, rate tables selected from a catalogue defined by the workload operational definition 336, metrics regarding customer systems 338 and metrics modified or added by a user 300 or another user 340 or by heuristics to estimate metrics.

The condition detector 316 monitors the state of the running workload with respect to the rules applicable to the workload at a given time and generates a tier change alert if the condition is true. The condition when it becomes true, becomes an indicator of the need to take an action to perform a chain in the tier. The condition detector 316 receives input from the tier change policy definer 320 as well as metric being monitored 328.

The tier change policy definer 320 includes workload type catalogue 322. The tier change policy definer 320 consumes rule tuples defined by the workload modeler 304 or directly defined and executes the workload model. The tier change policy definer receives input from a service management tier catalog 306, tier action 310, advanced metrics 314, condition detector 316, and workload 334.

The service tier switcher 318 receives input from the tier change policy definer 320 as well as the data from a warehouse 326 based on conditions. The service tier switcher 318 consumes the tier change alert from the condition detector 316 and operationalizes the tier change at a cost optimal point in time as required by triggering an action portion of the rule tuple for the tier change. The service tier switcher 318 also alters the hosting infrastructure across the cloud and transitional data centers to optimize cost to suit the target service tier and buffer spikes in the values of the attributes by filtering bursty behavior and by capping frequency of tier switches. The service tier switcher 318 also manages the business support system (BSS) functions such as billing, service usage metering, customer management and order orchestration.

The warehouse 326 is a central repository of integrated data from various sources like workloads 334, workloads operation definition 336, and monitoring metrics 328. The warehouse 326 provides metrics to the advanced metrics 314 and captures the output of the service tier switcher 318.

The configuration management database (CMDB) 324 is a standard enterprise IT service management database that contains all of the relevant information about the hardware and software components of the workloads used in a customer's organization IT services and relationships between those components, thereby providing an organized view of the configuration data and a means of examining that data from any desired perspective. The CMDB 324 gets configuration data from the service tier switcher 318 and feeds data to the workload type catalogue 322 in the tier change policy definer 320 during the tier changes.

The other managing systems 330 provide input regarding workloads 334 as well as infrastructure 332.

The workload 334 runs on infrastructure 332 and is defined by the workload operational definition 336. The workload consists of at least one container, server or VM.

Examples of types of workloads are ecommerce, analytics, telecommunications, retail, banking and insurance.

Figure 5:
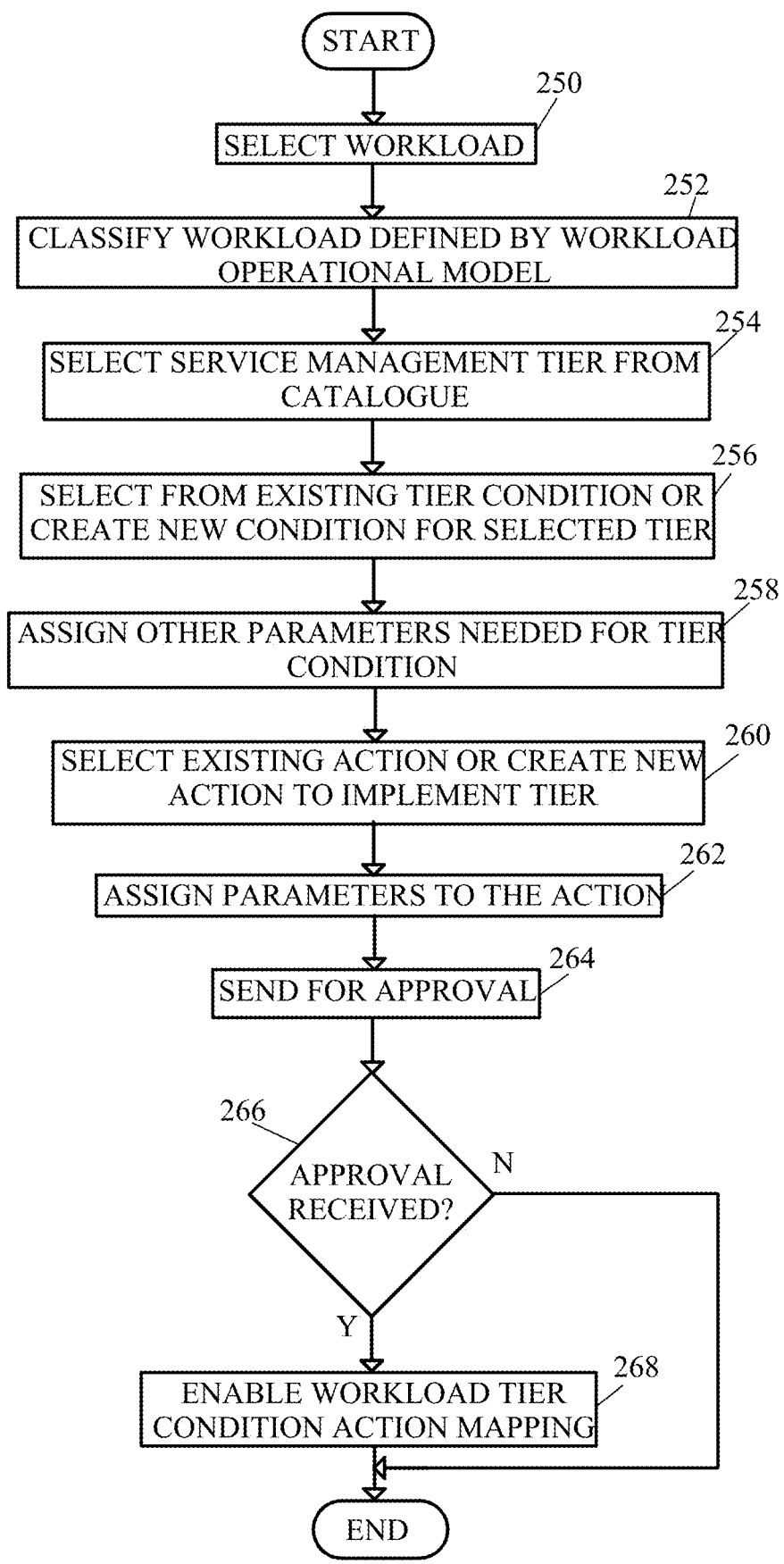
FIG. 5 shows a flow diagram of a method of defining policy action mapping.
Figure 6:
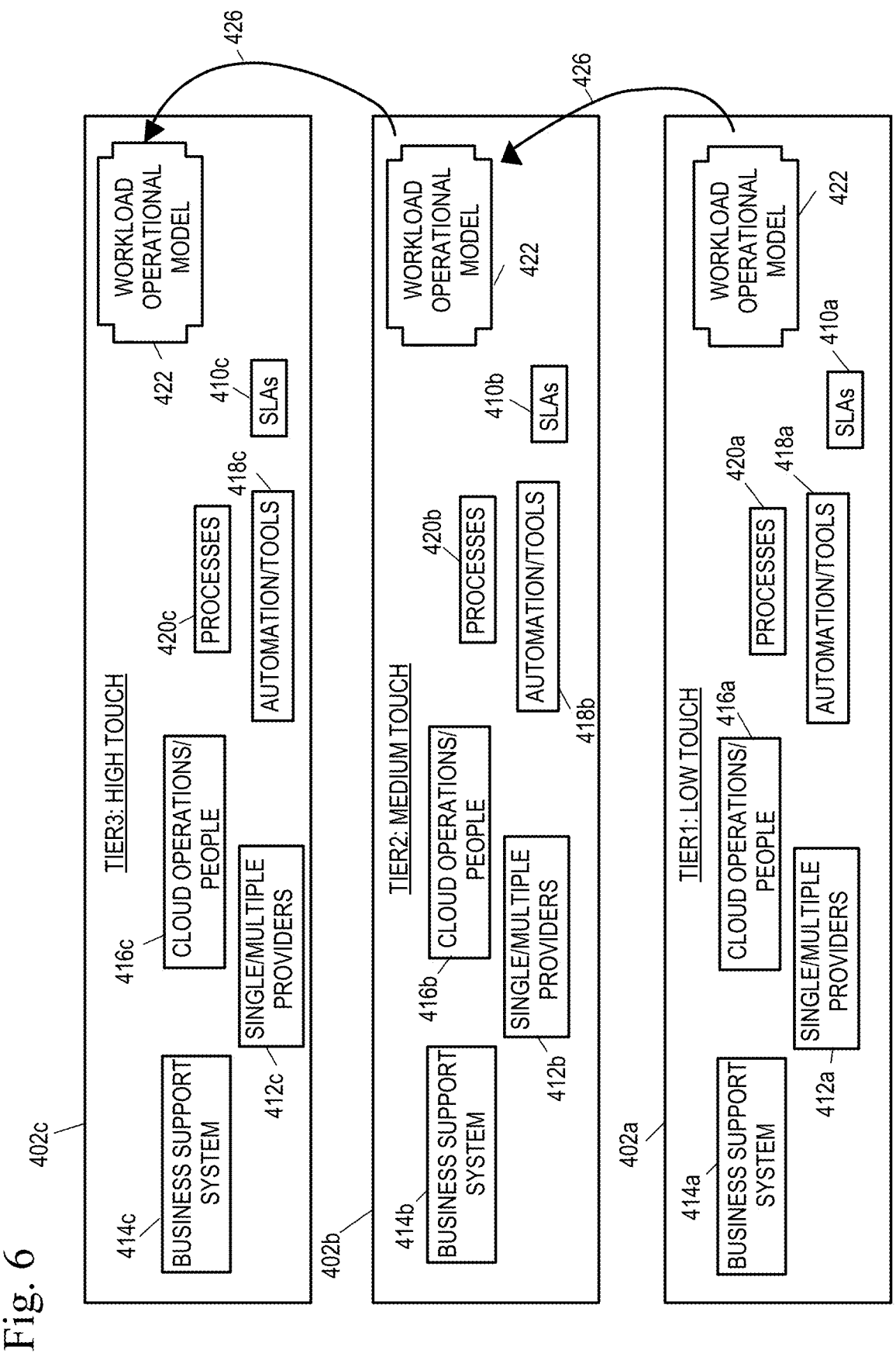
FIG. 6 shows an example of a workload change across tiers.

FIG. 6 shows an example of tiers across which workload tier change may be made, implemented through the service tier switcher 318 and based on a tier change policy present within the workload type catalogue 322 of the tier change policy definer 320. The tier change policy can be determined through the methods of FIG. 4 or 5.

The tiers included are Tier 1 corresponding to low touch 402a, Tier 2 corresponding to medium touch 402b, and Tier 3 corresponding to high touch 402c. Each of the tiers 402a-402c includes business support systems 414a-414c, single/multiple providers 412a-412c, cloud operations/people 416a-416c, automation/tools 418a-418c, processes 420a-420c, SLAs 410a-410c and a workload operation model 422. The workload can be based on various fields. Examples of workloads may be ecommerce, healthcare, and telecom. The workload operation model 422 is moved or changed 426 from Tier 1 402a to Tier 2 402b and Tier 2 402b to Tier 3 402c. The different tiers have different maintenance and costs.

Figure 4:
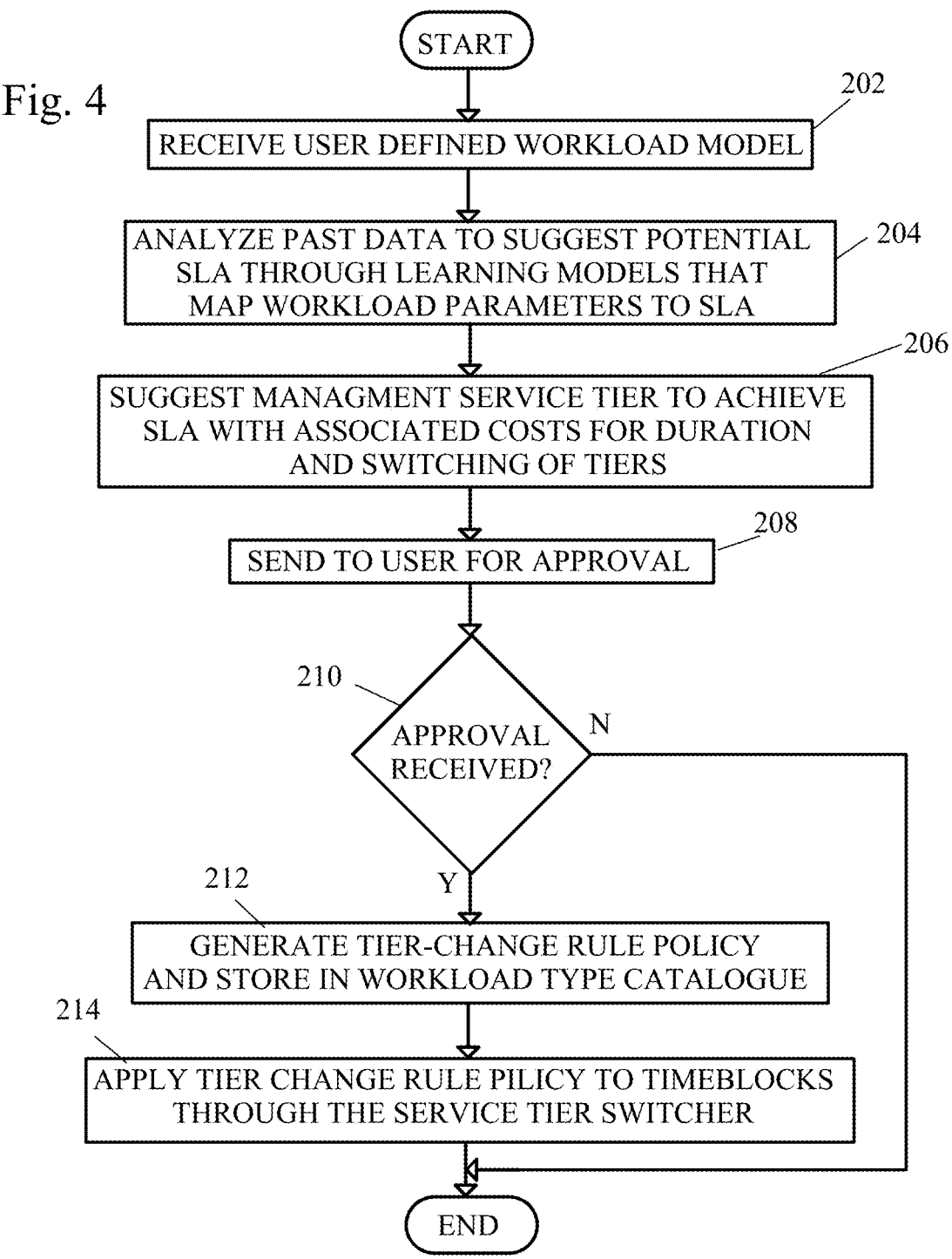
FIG. 4 shows a flow diagram of a method of generating a tier change policy.

A tier change can be executed by generating a tier change policy which is implemented through a model as described in FIG. 4 and through a manual approach as described in FIG. 5.

FIG. 4 shows a flow diagram of a method of generating a tier change policy.

In this embodiment, the tier optimizer system receives fixed tiers for each of the time blocks and defines workload models which are learned from past data and in conjunction with the fixed tier input to generate a tier change policy and suggest the appropriate service management tier for the workload.

In a first step, the tier change policy definer 320 of the tier optimizer 302 receives a user defined workload model, for example by the workload modeler 304 (step 202). The user defined workload model partitions time into blocks of potentially variable sizes across the cloud and traditional datacenters, provides workload topology and software stacks and assigns for each time block the expected value for one or more workload parameters that can be monitored or provided manually. The parameters are, for example:

a number or percentage or concurrency of users of the workload and type of uses;
a number or percentage of other applications supported or using this workload;
tickets and severity of tickets;
number of change tickets and types;
ability to recover from common failure modes;
committed SLAs and ability to support them using a tier;
total cost of operation of this workload for a given tier; and
business support system attributes.

The business support system attributes can include the risk of using a provider, revenue (or business benefit) from the workload, number of orders, number of page views, and cost, budget, variance, cost versus budget rations, rate tables, etc.

An example of a user interface to create the workload model for a software stack is shown in Table 1 below.

TABLE 1

| Costs vs Budgets (ratio/month) | 1.2 | 0.98 | 1 | 1.5 | 1.6 |
|---|---|---|---|---|---|
| #of tickets/ month | 5 | 4 | 4 | 2 | 1 |

TABLE 1-continued

| Concurrent users | 2 | 4 | 10 | 1 | 2 |
|---|---|---|---|---|---|
| Revenue | 10 | 20 | 50 | 10 | 20 |
| Time Block | 1 | 2 | 1 | 2 | 1 |

The tier change policy definer 320 of the tier optimizer 302 analyzes past data to suggest potential SLAs through learning models that map workload parameters to SLAs (step 204), for example using data from the advanced metrics 314, service management catalog 306, tier condition 308, tier action 310 and condition detector 316. The analysis of past data from a current customer or other customer aids in mapping the user's chosen parameters to the SLA. The workload topology and stacks aid in obtaining how "close" a workload from past history is to the current workload. The closeness to the current workload provides a weight to the data point to aid in computing overall expected availability as well as the tier. For each past workload the achieved availability and an appropriate management tier are determined as shown below.

The tier optimizer 302, through the tier change policy definer 320, suggests management service tiers to achieve SLAs with associated costs for duration and switching of the workload (step 206).

Table 2 below shows the suggested tiers and costs for the workloads.

TABLE 2

| Costs vs Budgets (ratio/month) | 1.2 | 0.98 | 1 | 1.5 | 1.6 |
|---|---|---|---|---|---|
| #of tickets/month | 5 | 4 | 4 | 2 | 1 |
| Concurrent users | 2 | 4 | 10 | 1 | 2 |
| Revenue | 10 | 20 | 50 | 10 | 20 |
| Timeblock | 1 | 2 | 1 | 2 | 1 |
| Computed Avg. | 99% | 99.9% | 99.9% | 98% | 98% |
| Computed Tier | Tier-Med | Tier-High | Tier-High | Tier-Low | Tier-Low |
| Cost-Plan = 100 | Cost-Tier-Med = 101 | Cost-Tier-High = 200 | Cost-Tier-High = 200 | Cost-Tier-Low = 50 | Cost-Tier-Low = 50 |

The tiers can computed in multiple ways. For example, in one embodiment, a subset of workloads can be summed based on weight or closeness ($c_1$, $c_2$, $c_n$) per subset. The tier with the maximum sum is chosen. Alternatively, the tier can be chosen by choosing the least costly tier that achieves availability A ($a_1$, $a_2$, $a_n$). In yet another embodiment, the tier can be calculated by choosing the tier in which the cost vs budget ($F_1$ $F_2$ $F_n$) is minimized.

'Closeness' between two workloads can be defined in multiple ways. But the above embodiments make use of the user defined parameters and the workload topology. For the user-defined parameters such as revenue, concurrent users, etc., a Euclidean distance measure can be defined to know which historical workload is closer to the current workload. Workload topology is further used compute the closeness as discussed in further detail below.

In graph closeness, each stack is a node and any dependency between nodes is an edge. The more the number of nodes and edges match, the more closer are the two graphs. A node matches another node if the individual components of the stack match. A dependency match is considered only if the nodes on the ends of the dependencies match.

In component closeness, a heuristic can be created which matches many features of any two workloads. Examples of such features are: (a) number of components (b) number of identical components (operating system, middleware, dependencies, etc) (c) topology graph.

The closeness from the user defined parameters and workload topology are preferably combined together into a single value or number. In a preferred embodiment, the heuristc $f(x, y) = (\max(x, y) + xy)/2$, where x and y are the two closeness measures discussed above is considered.

To estimate the availability of a tier from previous history based on closeness, the equation below is used. With $c_1$, $a_1$, $T_1$, $F_1$ being equivalent to the current workload and the remaining variables ($c_2$, $a_2$, $T_2$, $F_2$, $c_n$, $a_n$, $T_n$, $F_n$) being historical workloads. The availability of the current workload is determined and then the historical workloads are determined and for all historical workloads in which the availability is greater than or equal to A is determined, the weights of closeness per tier that occur in the subset are summed. The tier with the maximum sum is chosen. Alternatively, the least costly tier that achieves the availability A may be chosen. The formula below takes into account closeness ($c_1$, $c_2$, $c_n$) and measured availability ($a_1$, $a_2$, $a_n$). In an alternate embodiment, the cost vs budget ratio in use ($F_1$, $F_2$, $F_n$) may be used with the tier in use ($T_1$, $T_2$, $T_n$) as the two variables instead of closeness ($c_1$, $c_2$, $c_n$) and measured availability ($a_1$, $a_2$, $a_n$).

$$\text{Availability } A = (c_1 a_1 + c_2 a_2 + \ldots c_n a_n)/(c_1 + c_2 + \ldots c_n)$$

Figure 9:
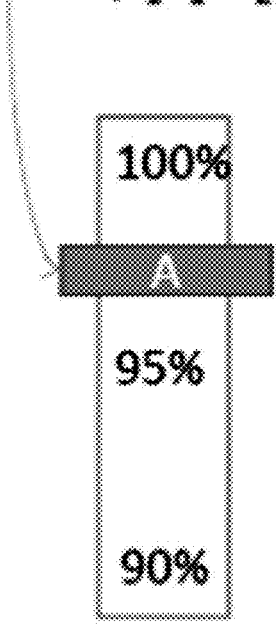
FIG. 9 shows a graph of availability based on the historical data.

Where:
$c_1$, $c_2$, $c_n$ is closeness
$a_1$, $a_2$, an is measured availability Rule tuples of a condition can be set based on the historical data as shown in FIG. 9.

Based on the historical data of Tables 1 and 2. For a given virtual machine (VM), that uses a DB2 VM and running an .ear application, the achieved availability was 99% with an "average" Service Management Tier being Medium.

An example rule tuple may be set as:
If Revenue in $[20 \pm \sigma_R]$&&
  Concurrent Users in $[4 \pm \sigma_U]$&&
  #Tickets/month in $[4 \pm \sigma_T]$&&
  Cost vs Budget Ratio in $[0.98 \pm \sigma_F]$&&
  in second time block
Then set the tier to "High"

The σ can be user provided to compute based on the dispersion of values of the parameters for each time block.

Cost vs budget is calculated as a factor of actual costs metered for the time vs budgets allocated for the particular period (e.g. per month). This ratio is either less than 1, 1 or more than 1. The cost efficiency comes with an optimum levels of users, tickets and revenue. When the costs exceed the budget (i.e. cost vs budget ratio exceeds 1), this doesn't result in a stoppage of service, rather that the budget is a target that is desired.

The suggested management service tiers to achieve SLAs (computed tier) with associated costs for duration and switching of the workload is sent to a user for approval (step 208), for example through the tier change policy definer 320. The associated costs preferably include a cost analysis which includes costs vs budget ratios of switching tiers and shows the benefit of the tier changes versus having a single tier for the whole duration.

When approval is received (step 210), tier-change rule policies are generated and stored in a workload type catalogue of the tier change policy definer 320 (step 212). The approval may include changes to the suggested SLAs, costs, budgets, and tiers. For example, the user may alter the budget for the month.

The tier-change rule policies for each timeblock are applied at the end of timeblock to determine if the tier can be changed to the designated tier through the service tier switcher 318. Multiple rules can be designated for a timeblock. An example of a rule tuple is shown above for detecting if a tier in the second timeblock should be changed to High. The above example also only shows a single rule per timeblock, but multiple rules can be designed.

If approval is not received (step 210), the method ends.

The tier change rule policy is applied to time blocks through service tier switcher (step 214) and the method ends.

FIG. 5 shows a flow diagram of a method of defining policy action mapping.

In this embodiment, the defined workload models are manually defined with the classified workload and linked to a predefined tier and tier conditions are set to enable a tier action, based on approval.

In a first step, the tier optimizer 302 receives a selected workload from a user (step 250). The workload consists of at least one or more of VMs, containers or servers.

The tier optimizer 302 receives a classification of the selected workload based on a defined workload operational model stored in the workload type catalogue 322 (step 252). The workload operational model includes a classification of similar workloads defined by a set of NFRs linked to a tier or provider which needs to be defined during a particular period of runtime. The workload operational model includes information from the workload operational definition 366 which classifies workloads based on a certain type business and/or technical function and defines non-functional requirements of the workload in terms of the following variables: availability based on SLAs; scalability in terms of elasticity of workload; security standards to be followed; performance such as cloud infrastructure provider supported ranges; interoperability such as moving between cloud providers; manageability of parameters to be monitored/managed; and adaptability regard how the workload types can be changed. All of the above variables can be defined in terms on the Tier type, and provider based on the NFRs.

The tier optimizer 302 receives a selection from the user of a service management tier from the service management tier catalog 306 (step 254). The service management tier includes predefined tools, people, processes, and SLAs.

The tier optimizer 302 receives a selection of an existing tier condition 308 or creation of a new condition for the selected tier (step 256). The tier condition is a Boolean condition relating at least one metric. The tier condition is considered to be true when an indicator of the need to take an action to perform a change in the tier for the workload is suggested.

The tier optimizer 302 receives assignment of other parameters which are needed for the tier condition (step 258). These parameters can include, but are not limited to, business support systems metrics which may be required for a condition. The business support systems metrics include cost, budget, variance, cost vs. budget ratios, rate tables and other information.

The tier optimizer 302 receives a selection of an existing action or creation of a new action to be performed in order to implement the tier. (step 260). The action is a specification of a process to be executed to implement the associated workload tier.

The tier optimizer 302 receives an assignment of parameters to the action (step 262).

A suggested management of the service tiers based on the user's manual selections to achieve SLAs with associated costs for duration and switching of the workload is sent to a user for approval (step 264).

When approval is received from the user (step 266), workload tier condition action mapping is enabled through the tier change policy definer (320). The approval may include changes to the suggested SLAs, costs, budgets, and tiers.

If approval is not received (step 266), the method ends.

Example

The user can provide input to the tier optimizer 302 and define the following:
Workload: ChildrensBookStore-VMs
Workload operation model type: Ecommerce op model
SMTier: Low Touch
Condition: number of users in the last 1 month is 100 && timeofyear is February && number of users in the next month is 100 to 200 && cost vs budget ratio is between 1.1 and 1.5
Action:
    Take downtime( )
    Current Tier.RemoveTools( )
    MigrateWorkload(Current Tier, LowTouch)
    LowTouch.installTools( )
    LowTouch.UpdateServiceManagementTools( )
    LowTouch.SetSLA( )

Based on the above example, the service tier switcher 318 would execute tier switching of the children's bookstore VM under specific conditions to a low touch tier.

The application of the tier change rule policy through the service tier switcher 318 based on a tier change rule policy (step 214) established through models (see FIG. 4 above) and the tier condition mapping (step 268) as established through manual selection by the user (see FIG. 5 above) is executed using a dynamic process of tier change with condition detector and service tier switcher of FIG. 7.

In a first step, the service tier switcher 318 receives real time metrics, for example through the monitoring of metrics 328 and/or obtains historical metrics from a database, such as warehouse 326 as well as the tier change policy for altering workload tiers (step 502).

Based on the metrics, the service tier switcher 318 determines condition of the running workload with respect to the rules applicable to the workload at a given time (step 504). If the determined condition is a condition which is designated as being applicable for a workload tier change, as defined by the tier change policy definer 320 (step 506), an alert is generated (step 508).

If the workload tier change as result of the condition needs to be approved by a user (step 510), the alert is sent to the user (step 512).

If the alert regarding the workload tier change does not need to be approved by the user (step 510), the workload is changed to a different tier per the tier change policy (step 514) and the method returns to step 502.

When approval is received from the user (step 518), the method continues to step 514 of changing the workload.

If approval is not received from the user (step 518), the method ends or can return to step 502.

If the determined condition is not a condition which is designated for a workload tier change (step 506), the method returns to step 502.

In an example, the service tier switcher 318 receives real time metrics, for example through the monitoring of metrics 328 in regards to a tier change policy for altering workload tiers. The tier change policy can be based on a business criticality, such as a number between 0 and 1 of the workload which is a function of the revenue, number of users, number of orders etc. to define a mapping between the workload's criticality and the tier. For each tier, a condition to detect is determined if the tier is appropriate to manage the workload and if the current tier is not the same as the tier required for the detected situation.

When the condition is determined to be true, the service tier switcher 318 generates an alert that includes a designated action and determines whether user approval is required. The alert sent to the user for approval may include a tier switching cost, as switching too often may result in higher cumulative cost if that is not offset by the cumulative advance of frequently switching to a lower tiered management tier.

An example of a condition is:
Tier Low Touch: % users expected in the next month <xL && # Incident tickets due to workload <2 && # change tickets in the last month=0
Tier Medium Touch: % users expected in the next month>xL but<xM && # incident tickets due to workload >2 but <5 && # change tickets in the last month=0.
Tier High Touch: (% users expected in the next month>xM && # incident tickets due to workload >5)||# change tickets in the last month >0

Figure 8:
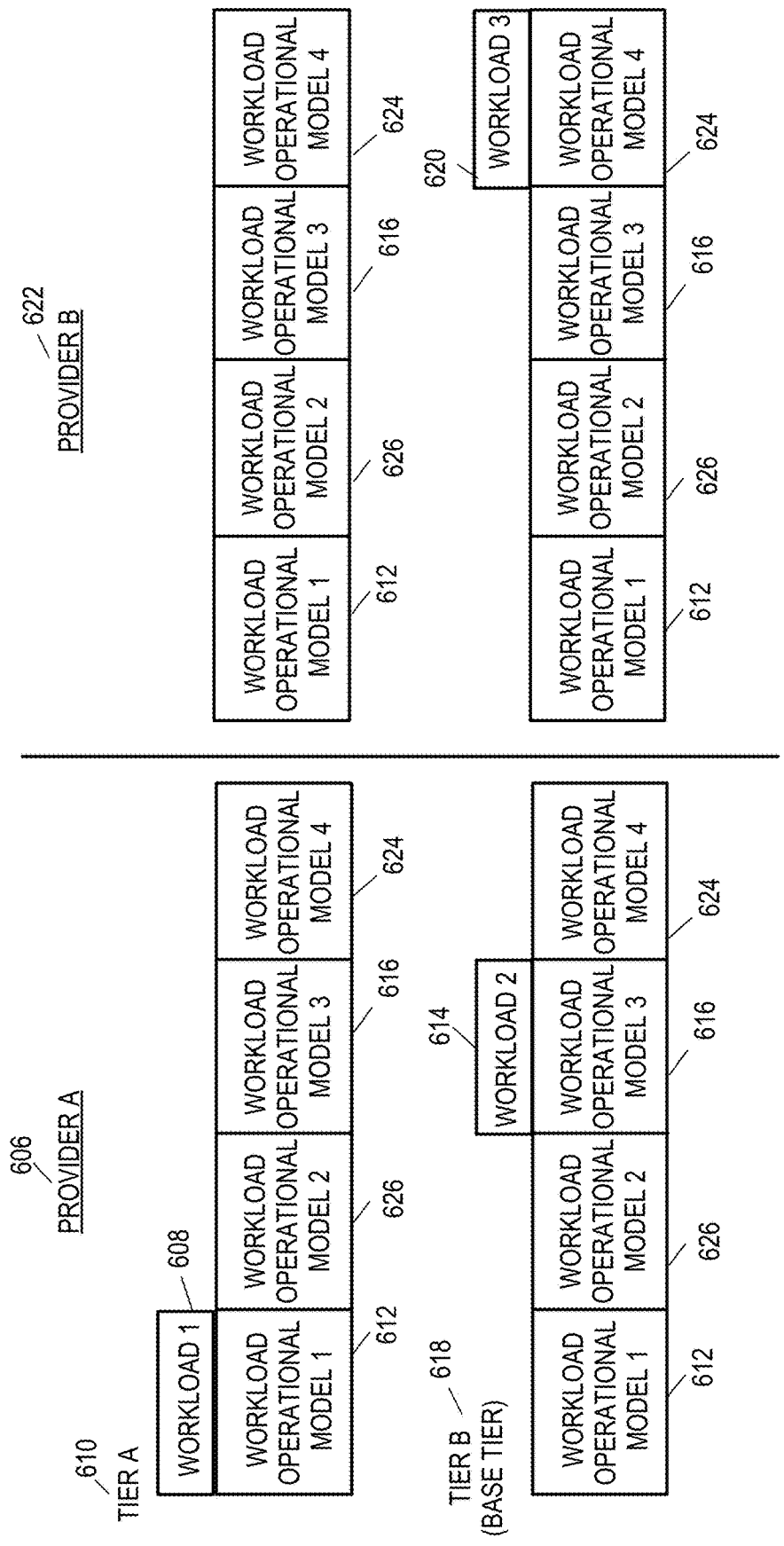
FIG. 8 shows a schematic of the business service management console.

FIG. 8 shows a schematic of the interface 602 of a business service management console and how workloads are applied to different providers for the same enterprise. The interface 602 aids in defining raw metrics, linking the metrics to the source of the metrics, and creating metrics which are functions of other metrics (advanced metrics).

A summary of the business services being provided for enterprise A 604 would be shown. For example, the summary for enterprise A can include the numbers of tiers, and tier policies defined, the number of providers defined, the number of workload operational models defined, the number of SLAs defined, the number of processes defined, the number of management services defined, the number of tools defined and the number of switching thresholds defined.

The associated tier and workload operation model for each of the workloads can also be shown. In this example, on provider A 606, a first workload 608 is present on tier A 610 and workload operational model one 612. Workload two 614 on provider A 606 is present on tier B 618, a base tier, on workload operation model three 616. A third workload 620 is present on provider B 622 on workload operational model four 624 of tier B 618. A workload is not present on workload operational model two 626.

A summary 628 regarding the services being provided can be displayed to a user of enterprise A. In this example, the summary includes the number of workloads running, the number of minor incidents, the number of severe incidents, the number of SLA breaches, the number of workload change requests successfully completed, the number of tier switches in the last 30 days and a total cost savings.

Additional metrics or parameters may be present in the summary or services and the summary of businesses services for an enterprise. While only two tiers were shown and three workloads, a plurality of tiers and workloads can be shown.

A system and method to model and execute rules to drive changes to management tiers with workloads including I. Creating a workload model (using a Modeler UI) to systematically design rules for tier switching II. A Tier Policy Definer that consumes rules defined by the modeler UI or directly defined and puts them into operation. III. A Condition Detector monitors the state of the running workload with respect to the rules applicable to the workload at a given time and generates an alert if the condition is true IV. A Service Tier Switcher consumes the alert from the Condition Detector a) Performs the tier change at a cost optimal point of time as required by the triggering rule.

The workload modeler allows: I. defining expected values to parameters that define functional and non-functional aspects of workloads II; defining the workload topology III; using past data to estimate an availability and tier for each time block IV; and generating rules for tier change for each time block 3. The workload model includes business-level parameters such the revenue or IT-level parameters such as the number of problem tickets. A new service tier effected by the Service Tier Switcher can be managed by an existing or a different provider. The Service Tier Switcher can optionally alter the hosting infrastructure across Cloud and traditional data centers to cost optimally suit the target service tier. The Service Tier Switcher buffers spikes in the values of the attributes by filtering bursty behavior and by capping frequency of tier switches. The workloads can be managed are hosted in a hybrid environment that spans one or more Cloud and traditional data centers.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of dynamically managing enterprise workloads between a plurality of management service tiers comprising the steps of:
   receiving a user defined workload model comprising: at least a partition of time segregated into blocks of variable sizes across a workload topology and assignment of expected values for each time block for workload parameters of a software stack;
   analyzing past data of the workload topology to suggest potential service level agreements through learning models that map workload parameters to the service level agreements;
   determining potential management service tiers to achieve service level agreements with associated costs for duration and switching of the workload;
   sending the potential management service tiers to the user for approval;
   as a result of receiving approval, generating a tier change rule policy for changing workloads between the management service tiers to achieve service level agreements with associated costs for duration of the time segregated into blocks of variable sizes across the workload topology of the user defined workload model; and
   executing a change of the workload between management service tiers according to the tier change rule policy.

2. The method of claim 1, wherein the tiers are present on a cloud environment.

3. The method of claim 2, wherein the cloud environment is a hybrid cloud environment.

4. The method of claim 1, wherein the workload parameters are selected from a group consisting of: a number of percentage or concurrency of users of the workload and type of uses of the workload; a number or percentage of other applications supported or using the workload;
   tickets and severity of tickets associated with the workload; number of change tickets and types of change tickets associated with the workload; ability to recover from common failure modes of the management service tier; committed service level agreements and ability to support the service level agreements using a management service tier; total cost of operation of the workload for a given management service tier; and business support system attributes.

5. The method of claim 4, wherein the business support system attributes are selected from a group consisting of risk associated with using a provider for the management service tiers; revenue associated with the workload; number of orders; number of page views; cost associated with the workload; budget associated with the workload, variance associated with the workload, ratios of cost versus budget associated with changing the workload; and rate tables.

6. The method of claim 1, wherein the step of analyzing past data of the workload topology to suggest potential service level agreements through learning models that map workload parameters to the service level agreements further comprises the steps of: determining how close a workload from past history is to a current workload by determining a weight, wherein the weight is based on a determination for each past workload an achieved availability relative to the service management tier the workload was executed on.

7. A computer program product for dynamically managing enterprise workloads between a plurality of management service tiers through a computer comprising at least one processor, one or more memories, one or more computer readable storage media, the computer program product comprising a computer readable storage medium having program instructions embodied therewith, the program instructions executable by the computer to perform a method comprising:
receiving, by the computer, a user defined workload model comprising: at least a partition of time segregated into blocks of variable sizes across a workload topology and assignment of expected values for each time block for workload parameters of a software stack;
analyzing, by the computer, past data of the workload topology to suggest potential service level agreements through learning models that map workload parameters to the service level agreements;
determining, by the computer, potential management service tiers to achieve service level agreements with associated costs for duration and switching of the workload;
sending, by the computer, the potential management service tiers to the user for approval;
as a result of receiving approval, generating, by the computer, a tier change rule policy for changing workloads between the management service tiers to achieve service level agreements with associated costs for duration of the time segregated into blocks of variable sizes across the workload topology of the user defined workload model; and
executing, by the computer, a change of the workload between management service tiers according to the tier change rule policy.

8. The computer program product of claim 7, wherein the tiers are present on a cloud environment.

9. The computer program product of claim 8, wherein the cloud environment is a hybrid cloud environment.

10. The computer program product of claim 7, wherein the workload parameters are selected from a group consisting of: a number of percentage or concurrency of users of the workload and type of uses of the workload; a number or percentage of other applications supported or using the workload; tickets and severity of tickets associated with the workload; number of change tickets and types of change tickets associated with the workload; ability to recover from common failure modes of the management service tier; committed service level agreements and ability to support the service level agreements using a management service tier; total cost of operation of the workload for a given management service tier; and business support system attributes.

11. The computer program product of claim 10, wherein the business support system attributes are selected from a group consisting of risk associated with using a provider for the management service tiers; revenue associated with the workload; number of orders; number of page views; cost associated with the workload; budget associated with the workload, variance associated with the workload, ratios of cost versus budget associated with changing the workload; and rate tables.

12. The computer program product of claim 7, wherein the step of analyzing past data of the workload topology to suggest potential service level agreements through learning models that map workload parameters to the service level agreements further comprises the steps of:
determining how close a workload from past history is to a current workload by determining a weight, wherein the weight is based on a determination for each past workload an achieved availability relative to the service management tier the workload was executed on.

13. The computer program product of claim 7, wherein the enterprise workloads are in a cloud environment.

14. A computer system for dynamically managing enterprise workloads between a plurality of management service tiers, the computer system comprising a computer comprising at least one processor, one or more memories, one or more computer readable storage media having program instructions executable by the computer to perform the program instructions comprising:
receiving, by the computer, a user defined workload model comprising: at least a partition of time segregated into blocks of variable sizes across a workload topology and assignment of expected values for each time block for workload parameters of a software stack;
analyzing, by the computer, past data of the workload topology to suggest potential service level agreements through learning models that map workload parameters to the service level agreements;
determining, by the computer, potential management service tiers to achieve service level agreements with associated costs for duration and switching of the workload;
sending, by the computer, the potential management service tiers to the user for approval;
as a result of receiving approval, generating, by the computer, a tier change rule policy for changing workloads between the management service tiers to achieve service level agreements with associated costs for duration of the time segregated into blocks of variable sizes across the workload topology of the user defined workload model; and
executing, by the computer, a change of the workload between management service tiers according to the tier change rule policy.

15. The computer system of claim 14, wherein the tiers are present on a cloud environment.

16. The computer system of claim 15, wherein the cloud environment is a hybrid cloud environment.

17. The computer system of claim 14, wherein the workload parameters are selected from a group consisting of: a number of percentage or concurrency of users of the workload and type of uses of the workload; a number or percentage of other applications supported or using the workload; tickets and severity of tickets associated with the workload; number of change tickets and types of change tickets associated with the workload; ability to recover from common failure modes of the management service tier; committed service level agreements and ability to support the service level agreements using a management service tier; total cost of operation of the workload for a given management service tier; and business support system attributes.

18. The computer system of claim 17, wherein the business support system attributes are selected from a group consisting of risk associated with using a provider for the management service tiers; revenue associated with the workload; number of orders; number of page views;
  cost associated with the workload; budget associated with the workload, variance associated with the workload, ratios of cost versus budget associated with changing the workload; and rate tables.

19. The computer system of claim 14, wherein the step of analyzing past data of the workload topology to suggest potential service level agreements through learning models that map workload parameters to the service level agreements further comprises the steps of:
  determining how close a workload from past history is to a current workload by determining a weight, wherein the weight is based on a determination for each past workload an achieved availability relative to the service management tier the workload was executed on.

20. The computer system of claim 14, wherein the enterprise workloads are in a cloud environment.

* * * * *